O. T. & O. C. GULLIXSON.
DITCHING MACHINE.
APPLICATION FILED JAN. 27, 1908.

900,072.

Patented Sept. 29, 1908.
3 SHEETS—SHEET 2.

Witnesses
A. G. Hague.
F. C. Dahlberg.

Inventors
O. T. Gullixson and
O. C. Gullixson.
by Orwig & Lane Atty's

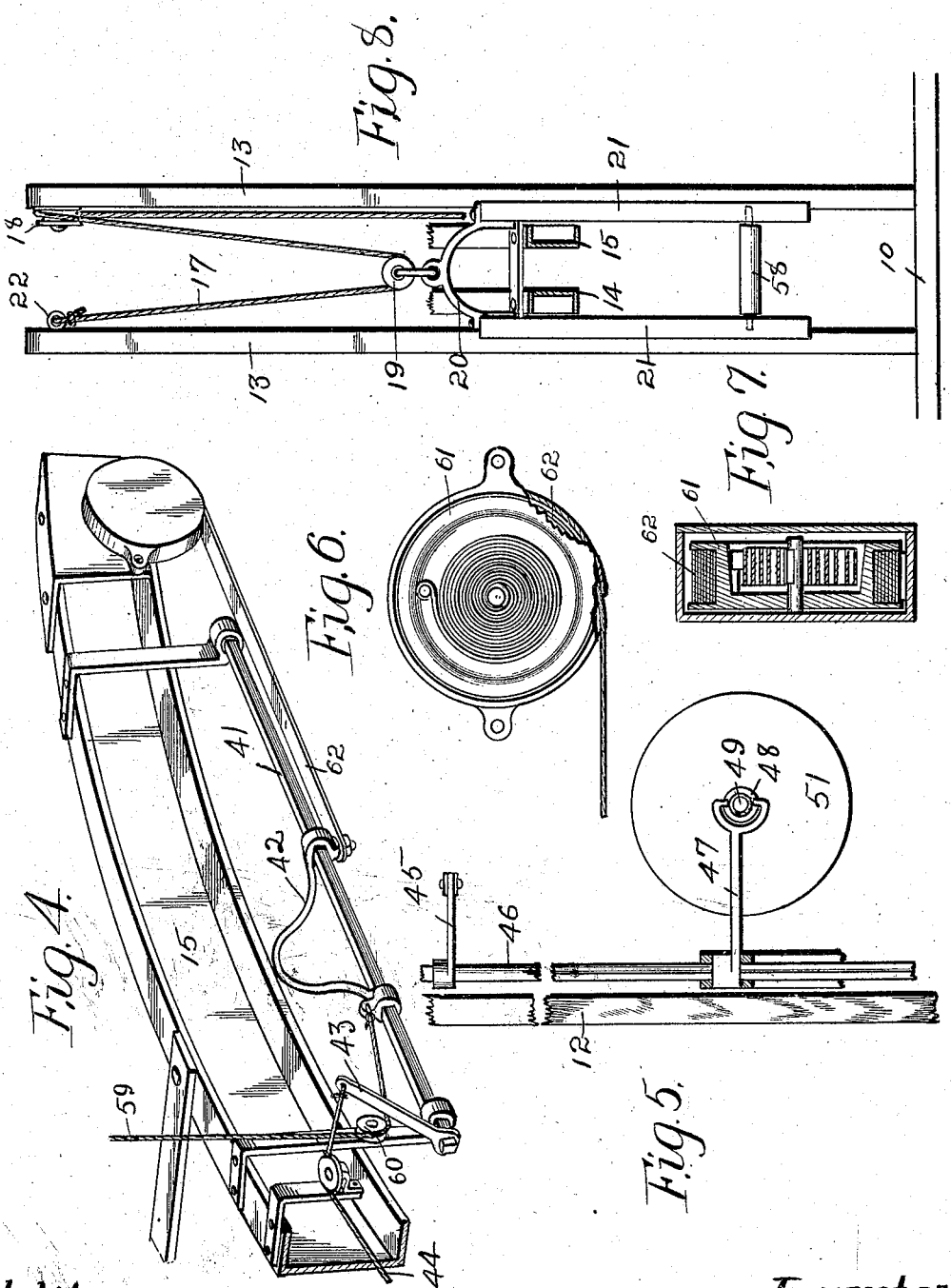

UNITED STATES PATENT OFFICE.

OSCAR T. GULLIXSON AND ORIN C. GULLIXSON, OF BODE, IOWA.

DITCHING-MACHINE.

No. 900,072.        Specification of Letters Patent.        Patented Sept. 29, 1908.

Application filed January 27, 1908. Serial No. 412,845.

*To all whom it may concern:*

Be it known that we, OSCAR T. GULLIXSON and ORIN C. GULLIXSON, citizens of the United States, residing at Bode, in the county of Humboldt and State of Iowa, have invented a certain new and useful Ditching-Machine, of which the following is a specification.

This invention relates to that class of ditching machines in which a track is extended transversely of the ditch, and a shovel is moved longitudinally of the track to remove earth from the top, and to discharge same at the ends of the track.

Our object is to provide a device of this kind in which the shovel is provided with a blade or back, capable of movement relative to the shovel, so that it may stand at one end of the shovel during the movement of the shovel in one direction, and at the other end of the shovel during the opposite movement thereof, and more specifically in this connection it is our object to provide means whereby a shovel blade or back may be automatically clutched to the supporting track of the shovel when the shovel has reached one limit of its movement, and will remain in said position until the shovel has moved a distance corresponding to its length in the opposite direction, to thereby cause the contents of the shovel to be scraped out and dumped, and to place the shovel blade or back out the opposite end of the shovel to thereby provide an automatic self-dumping and cleaning shovel that will operate equally well at both ends of the shovel movement.

A further object is to provide means for automatically causing the shovel to discharge at different distances from the center of the ditch, as the depth of the ditch increases, to thereby distribute the earth over a comparatively large area on both sides of the ditch.

Our invention consists in the construction, arrangement and combination of the various parts of the device, whereby the objects contemplated are attained, as hereinafter more fully set forth, pointed out in our claims and illustrated in the accompanying drawings, in which—

Figure 1:
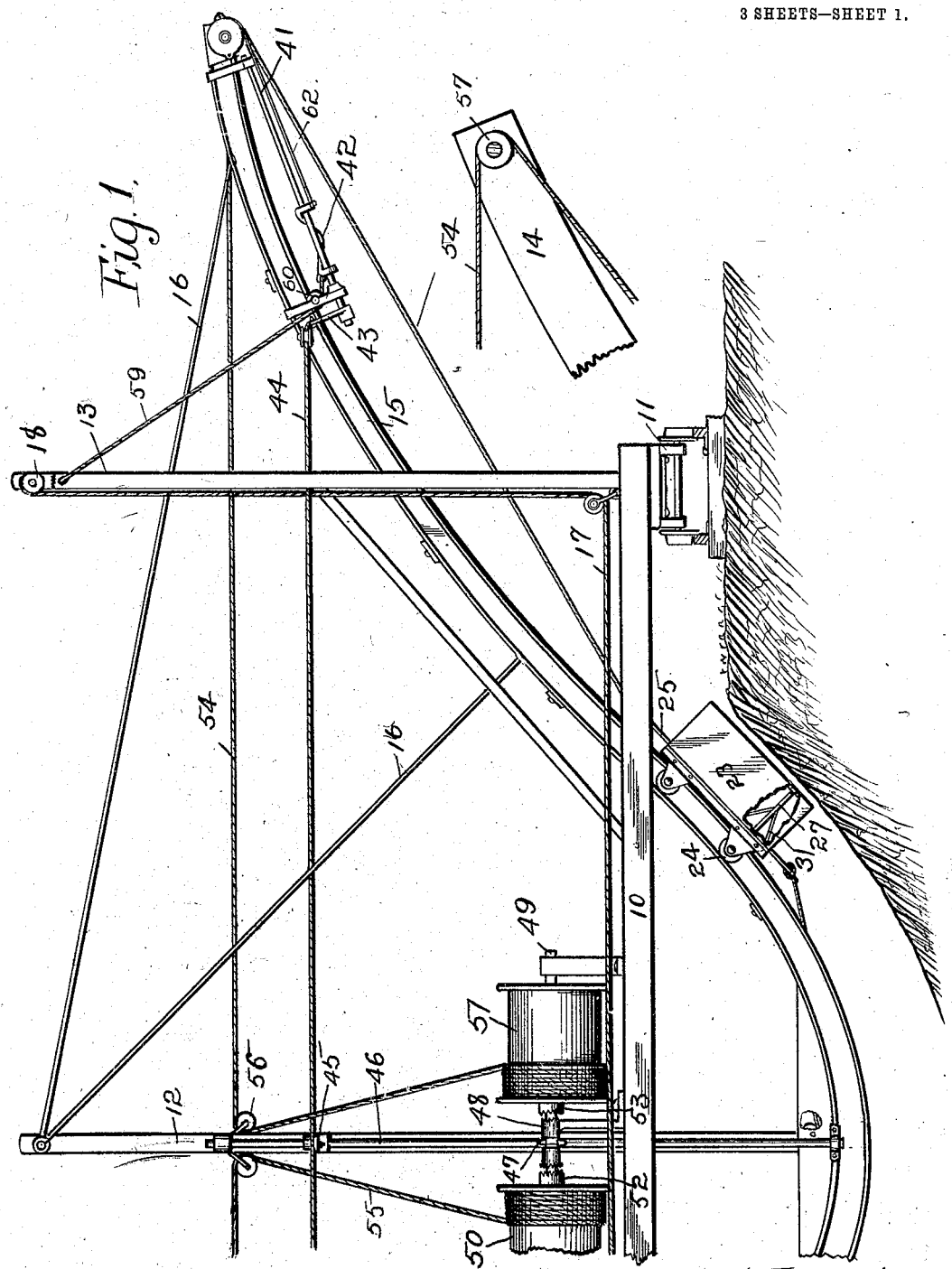
Figure 2:
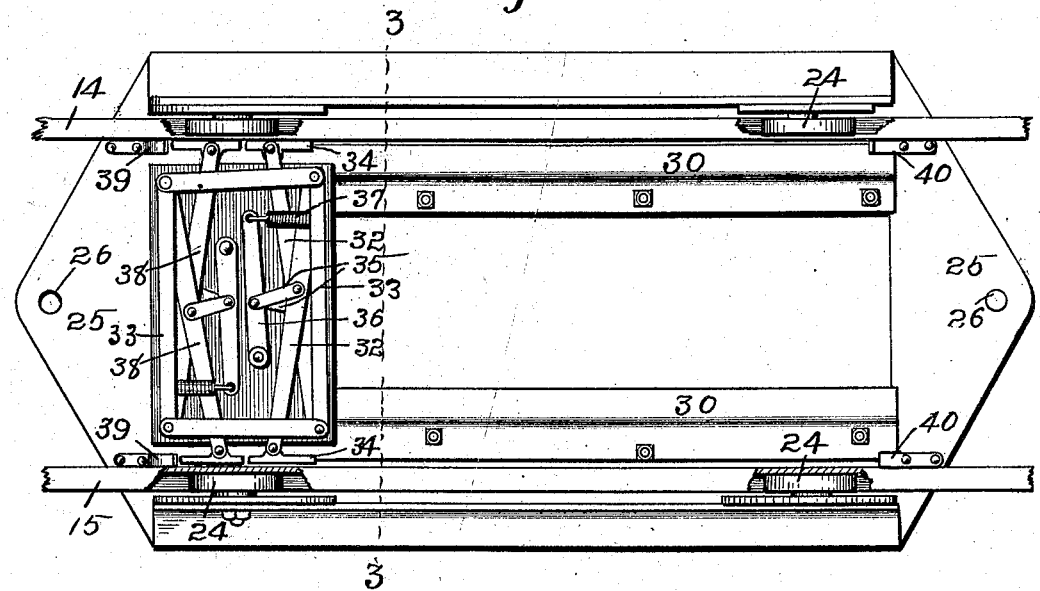
Figure 3:
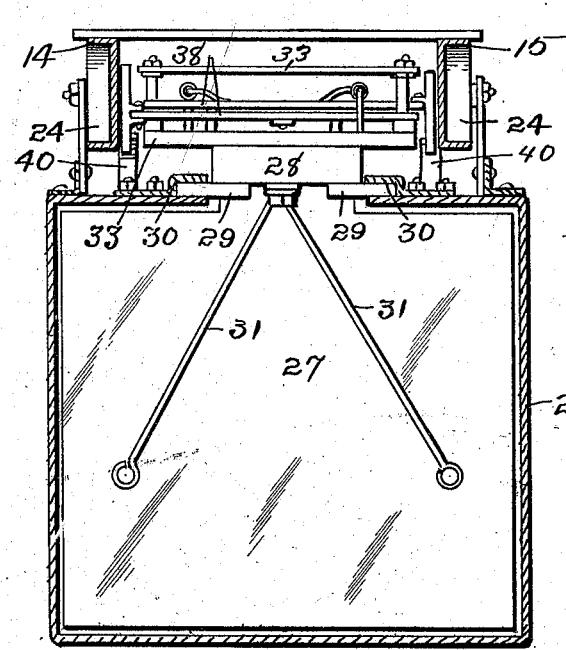

Figure 1 shows a front elevation of a part of a ditching machine having our improvement applied thereto. Fig. 2 shows a top or plan view of a shovel illustrating our improved means for automatically clutching and releasing the shovel blade or back relative to the shovel supporting track. Fig. 3 shows a sectional view on the line 3—3 of Fig. 2. Fig. 4 shows a detail perspective view illustrating the device at the outer end of the shovel supporting track for automatically reversing the movement of the shovel, and for automatically changing the discharge point of the shovel. Fig. 5 shows a detail side view of the means for operating the clutch device of the cable winding drums. Fig. 6 shows an enlarged detail side view of the spring actuated pulley for automatically moving the trip arm toward the outer end of the shovel supporting track. Fig. 7 shows a sectional view of same, and Fig. 8 shows a detail side view partly in section illustrating the means for raising and lowering the shovel supporting track relative to the uprights on the machine frame.

Referring to the accompanying drawings, we have used the reference numeral 10 to indicate the main platform of the ditching machine. This is preferably mounted upon two tracks, one of which is shown in Fig. 1, and is indicated by the numeral 11. At the center of the platform is an upright 12, and at each side thereof is a pair of uprights 13 spaced apart, one pair of which is shown in Fig. 1.

The track is formed of two channel bars 14 and 15 which are spaced apart and are curved to conform to the contour of the ditch to be dug. They are supported by braces 16 which are connected to the upright 12, the said upright being capable of up and down movement in the ordinary manner in machines of this kind.

Means for raising the shovel supporting track comprises a cable 17 passed over a pulley 18 on one of the uprights 13, then under a pulley 19 which is connected by means of a yoke 20 with a sliding frame 21. This sliding frame is in turn connected with the tracks 14 and 15. The said cable 17 has its end secured at 22 to the opposite one of the uprights 13. This means of raising and lowering the tracks does not form part of our present invention, and in machines of this class, the track is usually lowered automatically as the depth of the ditch increases.

The shovel comprises a shovel body 23 open at both ends. At its top are two supporting rollers 24 to operate in the tracks 14 and 15. At the tops of the ends of the shovel are the extensions 25 having openings 26 therein to receive the shovel operating cable. The shovel blade or back is indicated by the reference numeral 27 and is fixed to a block 28, which block is fixed to the guides 29, said guides being slidingly mounted in brackets 30 on top of the shovel body. The said shovel blade or back is preferably braced by the rods 31 so that it is firmly connected with the block 28. By this means, the shovel blade or back is permitted to slide relative to the shovel from one end to the other.

The means for clutching the shovel blade or back to the track comprises a pair of brake levers 32 pivoted in a frame 33 on top of the block 28, each being pivoted at one side corner of the frame 33, and extended across the frame and provided with a brake shoe 34 at its opposite ends. These levers 32 are inclined slightly toward one end of the shovel body so that if the shovel blade or back were moved relative to the shovel in a direction away from the end toward which said brake levers are inclined, the brake levers would slide along the tracks 14 and 15 without clutching them, but if the shovel blade or back were moved relative to the shovel in the opposite direction, the brake shoes would engage the track members 14 and 15.

Pivoted to the central portion of each of the levers 32 are the links 35, which are both connected to a lever 36 pivoted to the frame 33, and provided with a spring 37 so arranged as to yieldingly hold both brake levers in a direction with their brake shoes at their outer limit of movement, and in engagement with the tracks 14 and 15. Mounted on the same frame 33 are two similar brake levers 38, their ends containing the brake shoes being inclined in an opposite manner from the brake levers 32. In other respects, the connected parts are similar to the ones just described. By the arrangement shown, it is obvious that if the shovel is moved in one direction relative to the shovel blade or back, then one pair of the brake levers will clutch the tracks 14 and 15, and if the shovel is moved in the opposite direction relative to the shovel blade or back, then the other pair of brake levers will engage the tracks 14 and 15.

We have provided means for holding one pair of brake levers inoperative when the shovel blade or back is at either end of its movement relative to the shovel as follows: Connected with the shovel body are two stops 39 near one end, and two similar stops 40 near the other end, so arranged as to be engaged by the brake shoes. By means of this arrangement, and assuming the parts to be in the position shown in Fig. 2, and assuming further that the shovel body is being moved toward the right in said figure, then the stops 39 will engage the brake shoes of the levers 38 and hold them out of contact with the tracks 14 and 15 so that the shovel blade or back may move freely with the shovel, for when moving in this direction, the brake shoes 34 will not clutch the tracks. Then assuming that the movement of the shovel toward the right is stopped, and that the shovel begins to move toward the left, then the brake shoes 34 will at once clutch the tracks 14 and 15 and hold the shovel blade or back stationary until the stops 40 engage the brake shoes 34, whereupon the brake shoes will be released, and the shovel blade or back be permitted to move with the shovel along the track. By means of this arrangement, it is obvious that if the shovel is loaded when moving toward the right, then when the shovel blade or back is stopped, and the shovel is moved toward the left, then the contents of the shovel will be discharged through the right end thereof, and the shovel blade or back will be in position to permit a re-loading of the shovel on its next movement.

The means for automatically stopping and reversing the movement of the shovel on the shovel supporting track comprises an angular rod 41 supported near the outer end of the shovel supporting track, and capable of a rocking movement. Slidingly mounted upon the rod 41 is a trip arm 42 so arranged that it will stand in the path of the shovel when it approaches the end of the shovel supporting track, and be elevated by the shovel sufficiently to rock the rod 41.

Fixed to one end of the rod 41 is a lever 43, and connected with this lever is a cable 44 which cable is attached to a lever 45 secured to an upright rock shaft 46 on the stationary frame of the machine. Mounted upon the rock shaft 46 is a clutch lever 47 connected to a double clutch member 48 on the drum shaft 49. Two drums 50 and 51 are mounted on this shaft, and are provided with clutch members 52 and 53 designed to co-act with the double clutch member 48. By this arrangement of parts, and assuming that the shovel moves toward the end of the shovel supporting track, and strikes the trip arm 42, then the cable 44 is pulled, and the clutch 48 moved into engagement with the other cable winding drums, whereupon the other cable will be operated and the shovel immediately start on its return movement, as will hereinafter appear.

The shovel is moved by means of two cables 54 and 55, the cable 54 being wound upon the drum 51, passed over an elevated pulley 56, then around a pulley 57 at the outer end of the shovel supporting track, then attached to the end of the shovel. The said cable between the outer end of the shovel supporting track and the shovel, is passed over a supporting roller 58 shown in Fig. 8, to hold it from sagging down too far. The other cable 55 is arranged in a similar manner on the opposite side of the machine, not shown.

We have provided for automatically changing the dumping point of the shovel as follows: In this connection, it is to be understood that in starting a ditch, the shovel supporting track is in an elevated position, and then as the depth of the ditch increases, the shovel supporting track is lowered. We have taken advantage of this arrangement of parts as follows: Fixed to the upper end of the uprights 13 is a cable 59, which cable is passed around a pulley 60 on the shovel supporting track, and attached to the trip arm 42, which is slidingly mounted upon the rod 41.

Assuming that the trip arm 42 is at the outer limit of its movement, and the shovel supporting track is at its upper limit of movement, then obviously, as the shovel supporting track is lowered, the trip arm 42 will be moved away from the outer end of the shovel supporting track, and the dumping point of the shovel will thus be automatically changed.

In order to provide for moving the trip arm 42 outwardly automatically when the shovel supporting track is elevated, we have provided a spring actuated drum 61 mounted at the outer end of the track, and provided with a strap 62 fixed to and wound upon the drum, and attached to the arm 42. In this way, the arm 42 is automatically moved by the spring to its outer limit when the track is elevated.

In practical use, and assuming that the shovel supporting track is in an elevated position, and assuming further that the shovel is being moved toward the right, then when the shovel engages the ground, it will become loaded and will travel along the track until the shovel strikes the trip arm 42; then the cables that move the shovel will be reversed in their movement, and the shovel will immediately start toward the left. As soon as this reversal of the movement of the shovel takes place, the clutch levers on the shovel blade or back will automatically engage the shovel supporting track, and thus hold the blade or back stationary, and it will be held in this position until the shovel travels a distance corresponding to its length, and the stops on the shovel body engage the brake shoes, and thus release them from engagement with the track. The shovel will obviously become filled on each of its movements on the shovel supporting track, and the load will be discharged at each end of the track. As the depth of the ditch increases, the track is lowered in the ordinary way, and the dumping point of the shovels is automatically changed by means of the cable 59, as before explained, so that the earth is piled at the sides of the ditch over a comparatively large area, and hence, there is less liability of its falling back into the ditch.

Having thus described our invention, what we claim and desire to secure by Letters Patent is—

1. In a device of the class described, the combination of a shovel supporting track, a shovel capable of movement relative to the track, and open at both ends, a shovel blade or back capable of sliding movement relative to the shovel from one end to the other, a clutch device connected with the shovel blade or back, and designed to engage the shovel supporting track.

2. In a device of the class described, the combination of a shovel supporting track, a shovel capable of movement relative to the track, and open at both ends, a shovel blade or back capable of sliding movement relative to the shovel from one end to the other, an automatic clutch device connected with the shovel blade or back and designed to engage the shovel supporting track.

3. In a device of the class described, the combination of a shovel supporting track, a shovel capable of movement relative to the track and open at both ends, a shovel blade or back capable of sliding movement relative to the shovel, from one end to the other, means connected with the shovel blade or back for automatically clutching it to the supporting track, and means carried by the shovel for automatically releasing the clutching means when the end of the shovel moves to position adjacent to the shovel blade or back.

4. In a device of the class described, the combination of a shovel supporting track, a shovel capable of movement relative to the track, and open at both ends, a shovel blade or back capable of sliding movement relative to the shovel from one end to the other, two automatic clutch devices connected with the shovel blade or back, one arranged to engage the shovel supporting track when the shovel is moving in one direction, and the other to engage the shovel supporting track when the shovel is moving in an opposite direction, and stops at the ends of the shovel designed to engage said clutch devices.

5. In a device of the class described, the combination of a shovel supporting track, a shovel capable of movement relative to the track and open at both ends, a shovel blade or back capable of sliding movement relative to the shovel from one end to the other, two brake shoe levers pivoted to the shovel blade or back and extended outwardly and in a direction toward one end of the shovel brake shoes thereon, means for yieldingly holding the levers in engagement with the tracks, a second pair of levers with brake shoes thereon inclined slightly toward the end of the shovel, means for yieldingly holding them against the supporting tracks, and stops fixed to the ends of the shovel to engage said brake shoes.

6. In a device of the class described, the combination of a supporting frame, an upright connected with the supporting frame, a shovel supporting track capable of up and down movement relative to the supporting frame, a trip device slidingly mounted upon the shovel supporting track, a cable fixed to the trip device and extended upwardly and inwardly, and attached to the upright on the frame, and a shovel slidingly mounted upon the track and provided with means for discharging its load when it engages said trip device.

7. In a device of the class described, the combination of a supporting frame, an upright connected with the supporting frame, a shovel supporting track capable of up and down movement relative to the supporting frame, a trip device slidingly mounted upon the shovel supporting track, a cable fixed to the trip device and extended upwardly and inwardly, and attached to the upright on the frame, a shovel slidingly mounted upon the track and provided with means for discharging its load when it engages said trip device, and means for automatically moving the trip device toward the outer end of the track when the track is elevated.

8. In a device of the class described, the combination of a supporting frame, an upright connected with the supporting frame, a shovel supporting track capable of up and down movement relative to the supporting frame, a trip device slidingly mounted upon the shovel supporting track, a cable fixed to the trip device and extended upwardly and inwardly, and attached to the upright on the frame, a shovel slidingly mounted upon the track and provided with means for discharging its load when it engages said trip device, means for automatically moving the trip device toward the outer end of the track when the track is elevated, said means comprising a spring actuated drum, a strap fixed to and wound upon the drum and attached to the movable trip device.

9. In a device of the class described, the combination of a frame, a shovel supporting track mounted on the frame, a shovel mounted for movement upon said track, a shovel blade or back slidingly mounted in the shovel, a trip device mounted in the path of the shovel, cables connected with the shovel, means for operating the cable, and means actuated by the trip device for automatically reversing the movement of the cables connected with the shovel.

10. In a device of the class described, the combination of a supporting frame, a shovel supporting track, an open ended shovel mounted in said track, two drums mounted upon the frame, cables fixed to and wound upon the drums, and connected to opposite ends of the shovel, means carried by the shovel blade or back for automatically clutching it to the track when the movement of the shovel is reversed at the end of the track, a rod rockingly mounted at the end of the track, a trip device slidingly mounted upon said rod and in position to be engaged by the shovel, and tilted as required to rock the rod, an arm fixed to the rod, a cable connected to the arm and a clutch device connected to said cable for reversing the movement of the drums.

Des Moines, Ia., Dec. 24, 1907.

OSCAR T. GULLIXSON.
ORIN C. GULLIXSON.

Witnesses:
J. F. ANDERSON,
ARTHUR PEDERSON.